W. R. POMEROY.
CORN PLANTER.

No. 34,902. Patented Apr. 8, 1862.

Witnesses:
H. W. Coombs
Geo. Reid

Inventor:
W. R. Pomeroy
per Munn & Co
Attorneys

UNITED STATES PATENT OFFICE.

W. R. POMEROY, OF MILLERSBURG, OHIO.

IMPROVEMENT IN CORN-PLANTERS.

Specification forming part of Letters Patent No. 34,902, dated April 8, 1862.

*To all whom it may concern:*

Be it known that I, W. R. POMEROY, of Millersburg, in the county of Holmes and State of Ohio, have invented a new and Improved Corn-Planter; and I do hereby declare the following to be a full, clear, and exact description of the same, reference being had to the accompanying drawings, making a part of this specification, in which—

Figure 1:
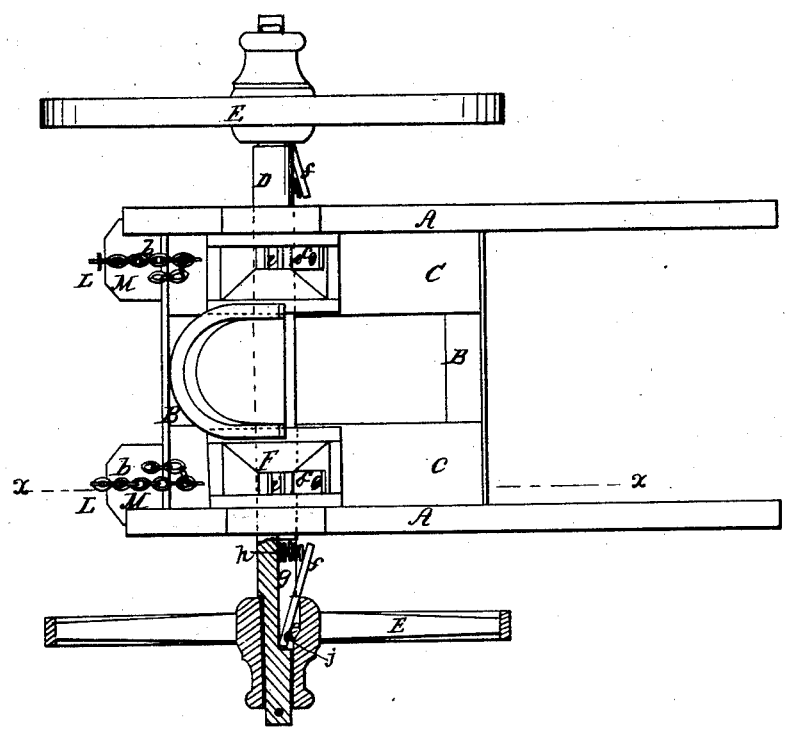
Figure 2:
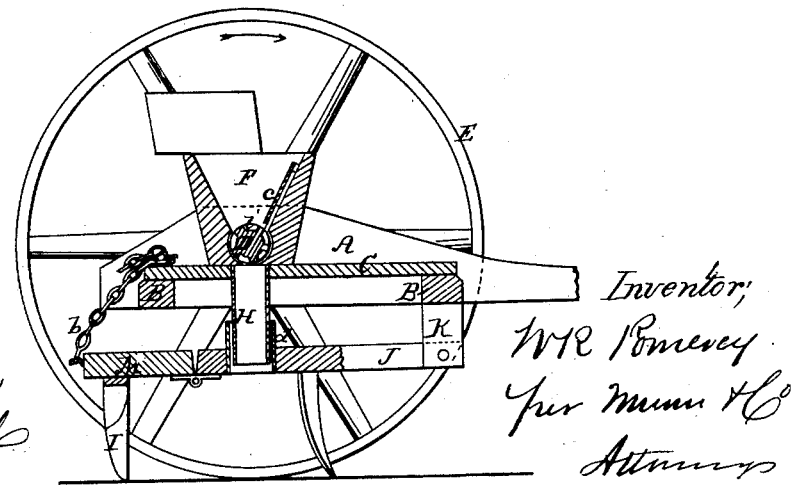

Figure 1 is a plan of my improved corn-planter, with one of the wheels and a portion of the axle shown in section. Fig. 2 is a longitudinal section of the same, taken at the line X X.

Similar letters of reference indicate corresponding parts in the two figures.

This invention is designed for planting corn in hills; and it consists in a device for throwing the seed-dropping apparatus out of gear when it is desired to transport the machine to or from the field, or for turning it at the end of the road.

To enable others skilled in the art to fully understand and construct my invention, I will proceed to describe it.

A A represent the thills of the implement, which extend to the rear of the axle, and, with the cross-pieces B B and boards C C, form the frame or body of the planter. The frame is supported on an axle, D, which is fitted to revolve in boxes on opposite sides thereof, and is furnished on each end with wheels E E, upon which the machine is transported.

Attached to the frame on opposite sides are hoppers F F, whose front and back sides converge downwardly. On the inner front side of each of the hoppers a brush is attached, which acts to keep back the surplus grain and prevents the dropping apparatus from clogging. The axle D passes through the lower part of the hoppers, and has a series of cavities or cups, $i$, formed in the periphery thereof, which, as the axle revolves, fill with grain and deposit the same at regular intervals in the hills through the conducting-tubes H H, attached to the under side of the hopper.

I I are the plows which form the furrows or drills. These plows are rigidly attached to the bars J J, which are pivoted at their front ends in the downwardly-projecting bars or pendants K K. Immediately behind the furrow-plows each of the bars J J has a hole through it and a tube, $d$, fitted therein, which tube is of somewhat longer diameter than and moves up and down over the conducting-tubes H H as the plows are elevated or depressed to form a furrow of greater or less depth.

L L are the coverers, arranged behind and on each side of the plows, and are attached to the bars M M, which are hinged in front to the back end of the pivoted bars J J and suspended at the back from the frame by chains $b\ b$.

The wheels E E are fitted loosely on the ends of the axles, and have formed on their inner side a rabbet or key-slot, $c$, into which a bar, $f$, pivoted by a pin, $j$, in a recess, $g$, formed in the axle, is pressed by a spiral spring, $h$, at their opposite end, which pivoted bar locks the wheels and axle together, and causes the cups $i$ as the axle revolves, while the implement passes over the field, to deposit a given quantity of grain at regular intervals in the furrow formed by the plow. By pressing down on the end of the pivoted bar, under which the other spring is placed, the wheels are liberated and allowed to revolve independently of each and of the axle.

The distances between the plows is intended to be the same as the distance apart the rows of corn are desired to be, and the distance between the wheels and plows just half the distance of the former, so that after the implement has crossed the field and is turned to go in the opposite direction, by keeping the wheel next to the planted ground in the old track the rows will be made parallel and of equal distances apart.

The coverers, being hinged independently of the frame and plows, adapt themselves to the inequalities of the ground, and thus cover all the corn equally deep.

The above-described implement is of durable and simple construction, not liable to get out of order, and does its work with great precision and regularity.

Having thus described my invention, what I claim as new herein, and desire to secure by Letters Patent, is—

The recess $g$, bar $f$, pivot $j$, and spring $h$, in combination with the wheel E and rabbet C, when arranged and operating in the manner and for the purpose described.

W. R. POMEROY.

Witnesses:
L. G. OSBORNE,
WM. P. McCARTNEY.